US009296977B2

(12) United States Patent
Kase et al.

(10) Patent No.: US 9,296,977 B2
(45) Date of Patent: Mar. 29, 2016

(54) METHOD FOR PRODUCING FATTY ACID COMPOSITION

(71) Applicant: KAO CORPORATION, Chuo-ku (JP)

(72) Inventors: Minoru Kase, Kamisu (JP); Toshiteru Komatsu, Kamisu (JP)

(73) Assignee: KAO CORPORATION, Chuo-ku (JP)

( * ) Notice: Subject to any disclaimer, the term of this patent is extended or adjusted under 35 U.S.C. 154(b) by 0 days.

(21) Appl. No.: 14/382,204

(22) PCT Filed: Feb. 28, 2013

(86) PCT No.: PCT/JP2013/055442
§ 371 (c)(1),
(2) Date: Aug. 29, 2014

(87) PCT Pub. No.: WO2013/129581
PCT Pub. Date: Sep. 6, 2013

(65) Prior Publication Data
US 2015/0011785 A1 Jan. 8, 2015

(30) Foreign Application Priority Data

Feb. 29, 2012 (JP) .................................. 2012-043839

(51) Int. Cl.
| | |
|---|---|
| *C11B 3/00* | (2006.01) |
| *C11C 1/04* | (2006.01) |
| *A23D 9/013* | (2006.01) |
| *C11C 1/00* | (2006.01) |
| *C11C 1/02* | (2006.01) |
| *C11C 3/02* | (2006.01) |

(52) U.S. Cl.
CPC . *C11B 3/00* (2013.01); *A23D 9/013* (2013.01); *C11C 1/005* (2013.01); *C11C 1/025* (2013.01); *C11C 1/04* (2013.01); *C11C 3/02* (2013.01)

(58) Field of Classification Search
None
See application file for complete search history.

(56) References Cited

U.S. PATENT DOCUMENTS

| | | | | |
|---|---|---|---|---|
| 2,800,493 A | * | 7/1957 | Stein et al. | 554/187 |
| 3,737,444 A | * | 6/1973 | Hartmann et al. | 554/212 |
| 3,950,371 A | * | 4/1976 | Jeromin et al. | 554/184 |
| 4,049,687 A | * | 9/1977 | Rek | 554/184 |
| 5,952,518 A | | 9/1999 | Sugiura et al. | |
| 6,232,480 B1 | * | 5/2001 | Kinsman et al. | 554/147 |

FOREIGN PATENT DOCUMENTS

| | | |
|---|---|---|
| EP | 2 175 032 A2 | 4/2010 |
| EP | 2 175 032 A3 | 4/2010 |
| JP | 46 35272 | 10/1971 |
| JP | 51 2087 | 1/1976 |
| JP | 4 306296 | 10/1992 |
| JP | 10 46186 | 2/1998 |
| JP | 11 106782 | 4/1999 |
| JP | 2011 78328 | 4/2011 |

OTHER PUBLICATIONS

Sutton, W.J.L., et al., Catalysis of fat hydrolysis by an acid regenerated catin exchange resin, 1953, The Journal of the American oil chemist's society, vol. 30, issue 11, pp. 449-451.*
International Search Report Issued May 28, 2013 in PCT/JP13/055442 Filed Feb. 28, 2013.
Extended European Search Report issued Oct. 19, 2015 in Patent Application No. 13755633.8.

* cited by examiner

*Primary Examiner* — Yate K Cutliff
(74) *Attorney, Agent, or Firm* — Oblon, McClelland, Maier & Neustadt, L.L.P.

(57) ABSTRACT

Provided is a method for producing a fatty acid composition having a low content of saturated fatty acid easily and with a high yield from a decomposed fatty acid composition containing monoacylglycerol. The method for producing a fatty acid composition having the content of saturated fatty acid of 8% by mass or less, comprising the following steps (1) to (3):
(1) obtaining a fatty acid mixture by adjusting the component ratio of a decomposed fatty acid composition obtained by hydrolyzing a fat or oil so that
the content of fatty acid is from 80 to 96% by mass,
the content of monoacylglycerol is from 0.3 to 8% by mass,
the content of diacylglycerol is from 1 to 12% by mass, and
the mass ratio of diacylglycerol to monoacylglycerol [ (DAG)/(MAG)] is from 0.5 to 40;
(2) cooling the fatty acid mixture obtained in step (1) to a temperature within the range from the temperature 2° C. lower than the cloud point of the fatty acid mixture to the temperature 13° C. lower than the cloud point, then mixing an aqueous wetting agent solution therewith, and maintaining the temperature of the mixture within the above-mentioned range; and
(3) separating the solid phase precipitated in step (2) and the aqueous phase from the liquid oil phase, thereby obtaining the fatty acid composition in the form of a liquid oil phase.

24 Claims, No Drawings

METHOD FOR PRODUCING FATTY ACID COMPOSITION

FIELD OF THE INVENTION

The present invention relates to a method for producing a fatty acid composition.

BACKGROUND OF THE INVENTION

Fatty acids are widely used as intermediates for foods, such as monoacylglycerol and diacylglycerol, and as additives and intermediates for a variety of industrial products. Such fatty acids are obtained as a decomposed fatty acid composition by hydrolyzing vegetable oils such as rapeseed oil and soybean oil, and animal fats such as beef tallow, and then used as a fatty acid composition.

However, the fatty acid composition produced by simply hydrolyzing the animal or vegetable fats or oils having the intact fatty acid composition as mentioned above is not necessarily suitable for industrial raw material. Thus, it is necessary to prepare the desired fatty acid composition, for example, containing low trans unsaturated fatty acid or low unsaturated fatty acid, depending on the purpose of utilization.

As a fractionation method of the fatty acid composition, compression, solvent fractionation, spontaneous fractionation (dry fractionation), and wetting agent fractionation are known. Among them, spontaneous fractionation and wetting agent fractionation are preferred from the viewpoint of separation efficiency, safety and economic performance.

Generally, the wetting agent fractionation is applied to the fatty acid composition which contains a large amount of saturated fatty acid originated from beef tallow or palm kernel oil, because a large amount of solid portion (crystals of saturated fatty acid) is formed by cooling (Patent Documents 1 to 4). On the other hand, the spontaneous fractionation is applied to the fatty acid composition which contains relatively low amount of saturated fatty acid, because smaller amount of solid portion is formed by cooling and the amount to be treated is small (Patent Document 5).

CITATION LIST

Patent Document

Patent Document 1: JP S46-35272 B A
Patent Document 2: JPH4-306296 A
Patent Document 3: JP S51-2087 B
Patent Document 4: JP H10-46186 A
Patent Document 5: JP H11-106782 A

SUMMARY OF THE INVENTION

The present invention provides a method for producing a fatty acid composition having the content of saturated fatty acid of 8% by mass or less, comprising the following steps (1) to (3):
(1) obtaining a fatty acid mixture by adjusting the component ratio of a decomposed fatty acid composition obtained by hydrolyzing a fat or oil so that
the content of fatty acid is from 80 to 96% by mass,
the content of monoacylglycerol is from 0.3 to 8% by mass,
the content of diacylglycerol is from 1 to 12% by mass, and
the mass ratio of diacylglycerol to monoacylglycerol [(DAG)/(MAG)] is from 0.5 to 40;
(2) cooling the fatty acid mixture obtained in step (1) to a temperature within the range from the temperature 2° C. lower than the cloud point of the fatty acid mixture to the temperature 13° C. lower than the cloud point, then mixing an aqueous wetting agent solution therewith, and maintaining the temperature of the mixture within the above-mentioned range; and
(3) separating the solid phase precipitated in step (2) and the aqueous phase from the liquid oil phase, thereby obtaining the fatty acid composition in the form of a liquid oil phase.

The present invention also provides a method for reducing the amount of saturated fatty acid in the fatty acid composition comprising the following steps (1) to (3):
(1) obtaining a fatty acid mixture by adjusting the component ratio of a decomposed fatty acid composition obtained by hydrolyzing a fat or oil so that
the content of fatty acid is from 80 to 96% by mass,
the content of monoacylglycerol is from 0.3 to 8% by mass,
the content of diacylglycerol is from 1 to 12% by mass, and
the mass ratio of diacylglycerol to monoacylglycerol [(DAG)/(MAG)] is from 0.5 to 40;
(2) cooling the fatty acid mixture obtained in step (1) to a temperature within the range from the temperature 2° C. lower than the cloud point of the fatty acid mixture to the temperature 13° C. lower than the cloud point, then mixing an aqueous wetting agent solution therewith, and maintaining the temperature of the mixture within the above-mentioned range; and
(3) separating the solid phase precipitated in step (2) and the aqueous phase from the liquid oil phase, thereby obtaining the fatty acid composition in the form of a liquid oil phase.

DETAILED DESCRIPTION OF THE INVENTION

In a typical wetting agent fractionation, fatty acid from which triacylglycerol and partial glyceride have been removed by distillation after hydrolysis of a fat or oil is used as a raw material in order to increase the separation efficiency (For example, Patent Document 1). Although distillation is necessary in order to obtain fatty acid with high purity, the content of partial glyceride does not necessarily cause a problem, for example, in the case that the fatty acid is used as a raw material for esterified oil, where the partial glyceride may remain.

Accordingly, an attempt was made to subject the intact decomposed fatty acid composition containing glyceride to the wetting agent fractionation. However, it was found that the increase of the slurry viscosity adversely affected the operability and solid-liquid separation performance in some cases.

The present invention relates to a method for producing a fatty acid composition having a low content of saturated fatty acid from a decomposed fatty acid composition containing monoacylglycerol easily and with a high yield.

The present inventors found that a fatty acid composition having a low content of saturated fatty acid could be recovered with a high yield by wetting agent fractionation with the co-existence of diacylglycerol of a certain proportion to monoacylglycerol, even from the decomposed fatty acid composition containing monoacylglycerol, because the increase of the slurry viscosity was suppressed and the precipitated saturated fatty acid was easily separated.

According to the present invention, the saturated fatty acid is easily and efficiently separated from the decomposed fatty acid composition after hydrolysis. Thus the fatty acid composition having a low content of saturated fatty acid can be obtained with a high yield. Using this fatty acid composition, the fat or oil composition with the suppressed crystallization at a low temperature can be obtained.

The decomposed fatty acid composition may be obtained by hydrolyzing a fat or oil.

The fat or oil herein includes not only triacylglycerol, but also monoacylglycerol and diacylglycerol.

The fat or oil to be hydrolyzed in step (1) may be either of vegetable oil or animal fat, suitably including, for example, rapeseed oil, soybean oil, sunflower oil, cottonseed oil, palm oil, and the like. Among them, cottonseed oil, sunflower oil and palm oil are preferred because the content of linolenic acid is low, thus it is possible to decrease the content of trans unsaturated fatty acid after hydrolysis. In addition, it is preferable to use the undeodorized oil or fat which has not been deodorized in the purification treatment as a part or the whole of the raw material, because the content of trans unsaturated fatty acid after hydrolysis may be decreased.

The fatty acid constituting the fat or oil in the present invention is not particularly limited, and either of saturated fatty acid or unsaturated fatty acid may be used. In order to exert the effect of the present invention, the method of the present invention is preferably applied to the fat or oil in which saturated fatty acid accounts for 20% by mass (hereinafter simply "%") or less, more preferably 18% or less, even more preferably 14% or less, of the fatty acid constituting the fat or oil. In addition, from the similar viewpoint, the method is preferably applied to the fat or oil in which saturated fatty acid accounts for 6% or more, more preferably 8% or more, of the fatty acid. The method is also preferably applied to the fat or oil in which saturated fatty acid accounts for from 6 to 18%, more preferably from 8 to 14%, of the fatty acid constituting the fat or oil. The carbon number of the saturated fatty acid is preferably from 12 to 24, more preferably from 16 to 20.

It is preferable to remove the solid component other than the oil component from the fat or oil after extraction from the plant or animal as a raw material by filtration or centrifugation. Then, it is preferable to degum the fat or oil by separating the gum by, for example, centrifugation after adding and mixing with water and, optionally acid in some cases. It is also preferable to remove acid from the fat or oil by adding and mixing with an alkali followed by washing with water and removing the water. In addition, it is preferable to decolorize the fat or oil by contacting it with an adsorbent such as an activated white earth followed by separating the adsorbent by, for example, filtration. Although these treatments are preferably performed in the above-mentioned order, the order may be changed. Additionally, winterizing may also be done for the fat or oil to separate the solid component at a low temperature, thereby removing the wax component.

The method to hydrolyze a fat or oil includes high-temperature high-pressure decomposition method and enzymatic decomposition method.

The high-temperature high-pressure decomposition method is a method to obtain fatty acid and glycerol by adding water to the fat or oil and allowing the mixture to react under a condition of high temperature and high pressure. The enzymatic decomposition method is a method to obtain fatty acid and glycerol by adding water to the fat or oil and allowing the mixture to react under a condition of low temperature, using a fat or oil hydrolyzing enzyme as a catalyst.

In the hydrolysis by high-temperature high-pressure decomposition method, it is preferable to add from 10 to 250 parts by mass (hereinafter, simply referred to as "parts") of water to 100 parts of a fat or oil, followed by hydrolysis for from 0.1 to 10 hours under a condition of the temperature of from 200 to 270° C. and the pressure of from 2 to 8 MPa. From the viewpoint of the industrial productivity of the decomposed fatty acid composition, decolorization, and suppression of forming the trans unsaturated fatty acid, the temperature is more preferably from 210 to 265° C., even more preferably from 215 to 260° C. The amount of water relative to 100 parts of a fat or oil is more preferably from 15 to 150 parts, even more preferably from 20 to 120 parts, from the similar viewpoint. The pressure is more preferably from 2 to 7 MPa, even more preferably from 2.5 to 6 MPa, from the similar viewpoint. The reaction time is more preferably from 0.2 to 6 hours, even more preferably 0.3 to 4 hours, from the similar viewpoint.

Preferred reaction apparatuses for the high-temperature high-pressure decomposition method include a countercurrent type Colgate-Emery fat and oil decomposition column provided with a hydrolysis vessel of a volume of from 7 to 40 $m^3$ (e.g., from IHI Corporation). A commercial autoclave (e.g., from Nitto Koatsu Co., Ltd.) may also be used as a hydrolysis vessel for a small laboratory scale decomposition.

As a fat or oil hydrolyzing enzyme used for a method of enzymatic decomposition of a fat or oil, lipase is preferably used. Not only the lipase originated from animals and plants, but also the commercial lipase originated from microbes may be used. For example, the microbially derived lipase includes those originated from genus *Rhizopus*, genus *Aspergillus*, genus *Mucor*, genus *Rhizomucor*, genus *Pseudomonas*, genus *Geotrichum*, genus *Penicillium*, genus *Candida*, and the like.

The fat or oil hydrolyzing enzyme is preferably immobilized on a carrier from the viewpoint of effective utilization of the enzyme activity. Usage of the immobilized enzyme is also preferable since the hydrolysis product and the enzyme are separated simply and easily.

It is preferable that the hydrolysis activity of the fat or oil hydrolyzing enzyme be 20 U/g or more, more preferably from 100 to 10000 U/g, even more preferably from 500 to 5000 U/g. Note that one unit of the enzyme refers to the decomposition activity of the enzyme which produces 1 μmol of free fatty acid per minute when a mixture of fat or oil and water in the mass ratio of 100:25 is hydrolyzed for 30 minutes under stirring at 40° C.

Although the fat or oil hydrolyzing enzyme may be used whether in a packed column or in a stirring vessel, usage in the state of packed column is preferable from the viewpoint to suppress fracturing of the immobilized enzyme.

The amount of the enzyme (dry mass) to be used to hydrolyze the fat or oil may be determined as needed considering the enzyme activity and is preferably from 0.01 to 30 parts, more preferably from 0.1 to 20 parts, even more preferably from 1 to 10 parts relative to 100 parts of the fat or oil to be decomposed. The amount of water is preferably from 10 to 200 parts, more preferably from 20 to 100 parts, even more preferably from 30 to 80 parts relative to 100 parts of the fat or oil to be decomposed. Any of distilled water, ion-exchanged water, degassed water, tap water, well water, and the like may be used. The water may contain some water soluble components such as glycerol. A buffer solution of the pH of from 3 to 9 may be used as needed to maintain the enzyme stability.

The reaction temperature is preferably from 0 to 70° C., more preferably from 20 to 50° C., in which range the enzyme activity is utilized more effectively and the free fatty acid formed by decomposition does not crystallize. The reaction is preferably performed in the presence of inert gas such as nitrogen in order to avoid contact with air as much as possible from the viewpoint to suppress the oxidative degradation of the decomposed fatty acid composition.

In the present invention, hydrolysis of a fat or oil may be performed batch-wise, continuously, or semi-continuously. Fat or oil and water may be supplied to the apparatus either in a parallel current or in a counter current. It is preferable to supply the fat or oil and water to the hydrolysis apparatus after degassing or deoxidizing as needed from the viewpoint to suppress oxidation of fat or oil.

Hydrolysis of a fat or oil is controlled with the concentration of the fatty acid in the decomposed fatty acid composition and the reaction should be terminated when the concentration reaches the predetermined value. Note that "the concentration of fatty acid" in this invention means the value obtained according to the method described in "Analysis Method (iv)" below.

In the present invention, it is preferable to perform the hydrolysis of a fat or oil until the concentration of fatty acid reaches from 80 to 96%, more preferably from 82 to 95%, more preferably from 84 to 94%, even more preferably from 86 to 93% from the viewpoint to suppress the increase of the slurry viscosity, thereby enabling easy separation of the saturated fatty acid precipitated, to reduce the amount of saturated fatty acid in the objective fatty acid composition, and to improve the yield of the objective fatty acid composition.

The decomposed fatty acid composition obtained by the hydrolysis reaction contains the unreacted fat or oil, i.e., triglyceride, diglyceride and monoglyceride besides the fatty acid. Although the decomposed fatty acid composition obtained by the hydrolysis of fat or oil may be used for the wetting agent fractionation mentioned below without distillation in the present invention, distillation may be performed provided that the concentrations of the fatty acid and monoacylglycerol in the fatty acid mixture after distillation fall within the range mentioned below. Adsorbent treatment, filtration, and the like may be performed as needed after distillation.

In step (1), the fatty acid mixture is obtained by adjusting the component ratio of the decomposed fatty acid composition obtained by hydrolyzing a fat or oil so that the content of fatty acid is from 80 to 96%, the content of monoacylglycerol is from 0.3 to 8%, the content of diacylglycerol is from 1 to 12%, and the mass ratio of diacylglycerol to monoacylglycerol [(DAG)/(MAG)] is from 0.5 to 40. By adjusting the content of diacylglycerol in the fatty acid mixture in such range, the slurry viscosity during the wetting agent fractionation may be decreased and the saturated fatty acid may be fractionated and removed easily and effectively.

In the present invention, the content of fatty acid in the fatty acid mixture is preferably from 80 to 96%, more preferably 82% or more, more preferably 84% or more, even more preferably 86% or more, from the viewpoint to suppress the increase of the slurry viscosity, thereby enabling easy separation of the saturated fatty acid precipitated, to reduce the amount of saturated fatty acid in the objective fatty acid composition, and to improve the yield of the objective fatty acid composition and is preferably 95% or less, more preferably 94% or less, even more preferably 93% or less, from the viewpoint to reduce the amount of saturated fatty acid in the objective fatty acid composition. The content of fatty acid in the fatty acid mixture is preferably from 82 to 95%, more preferably 84 to 94%, even more preferably from 86 to 93%.

The content of monoacylglycerol in the fatty acid mixture is from 0.3 to 8%, and preferably 0.4% or more, more preferably 0.5% or more, even more preferably 0.6% or more, from the viewpoint to reduce the viscosity of the fatty acid mixture and is preferably 6.5% or less, more preferably 5.5% or less, more preferably 4.5% or less, even more preferably 4% or less, from the viewpoint to increase the content of fatty acid in the objective fatty acid composition. The content of monoacylglycerol in the fatty acid mixture is preferably from 0.3 to 6.5%, more preferably from 0.4 to 5.5%, more preferably from 0.5 to 4.5%, even more preferably from 0.6 to 4%.

The content of trans unsaturated fatty acid in the fatty acid mixture is preferably from 0 to 2%, more preferably from 0 to 1.5%, even more preferably from 0 to 1%, from the viewpoint to improve the cold stability of the resultant fatty acid composition.

The content of diacylglycerol in the fatty acid mixture is from 1 to 12%, and preferably 2% or more, more preferably 2.5% or more, even more preferably 3% or more, from the viewpoint to suppress the increase of the slurry viscosity, thereby enabling easy separation of the saturated fatty acid precipitated and to improve the yield of the objective fatty acid composition and is preferably 11% or less, more preferably 10% or less, even more preferably 9% or less, from the viewpoint to increase the content of fatty acid in the objective fatty acid composition. The content of diacylglycerol in the fatty acid mixture is preferably from 2 to 11%, more preferably from 2.5 to 10%, even more preferably from 3 to 9%.

The mass ratio of diacylglycerol to monoacylglycerol [(DAG)/(MAG)] in the fatty acid mixture is from 0.5 to 40, and preferably 0.6 or more, more preferably 0.8 or more, more preferably 1 or more, even more preferably 1.1 or more and is preferably 20 or less, more preferably 12 or less, more preferably 9 or less, even more preferably 7 or less, from the viewpoint to suppress the increase of the slurry viscosity, thereby enabling easy separation of the saturated fatty acid precipitated and to improve the yield of the objective fatty acid composition. The mass ratio of diacylglycerol to monoacylglycerol [ (DAG)/(MAG)] in the fatty acid mixture is preferably from 0.6 to 20, more preferably from 0.8 to 12, more preferably from 1 to 9, even more preferably from 1.1 to 7.

The methods to adjust the content of diacylglycerol in the fatty acid mixture as mentioned above include, for example, a method to adjust the content in the above-mentioned range by adding diacylglycerol or a diacylglycerol-containing oil, a method to adjust the hydrolysis conditions, a method to mix the fatty acid mixture obtained by high-temperature high-pressure decomposition and the fatty acid mixture obtained by enzymatic decomposition.

In step (2), the fatty acid mixture having the content of diacylglycerol adjusted in the above-mentioned step (1) is cooled to a temperature within the range from the temperature 2° C. lower than the cloud point of the fatty acid mixture to the temperature 13° C. lower than the cloud point, then mixing an aqueous wetting agent solution therewith, and maintaining the temperature of the mixture within the above-mentioned range. Note that "the range from the temperature 2° C. lower than the cloud point(° C.) to the temperature 13° C. lower than the cloud point (° C.)" may be hereinafter represented by "from cloud point −2 to −13° C.", or represented simply by "cooling temperature range". By cooling the fatty acid mixture to such temperature range, saturated fatty acid in the fatty acid mixture crystallizes and the crystals of the saturated fatty acid precipitated turn hydrophilic from hydrophobic, when mixed with the aqueous wetting agent solution, to move from the oil phase to the aqueous phase and disperse in the aqueous phase, thus being easily separated from the liquid oil phase composed of the fatty acid composition.

The cloud point of the fatty acid mixture herein means the temperature at which the clear oil phase starts to become turbid, which may be measured according to the method described in the examples below.

In the present invention, it is preferable to set beforehand the temperature of the fatty acid mixture at a temperature at least 10° C. higher than its cloud point prior to the step (2). By maintaining such temperature, the saturated fatty acid which will precipitate later may be sufficiently dissolved, thus having the saturated fatty acid selectively precipitate at the subsequent precipitation. Such temperature depends on the cloud point of the fatty acid mixture and, for example, is preferably at least 15° C. higher, more preferably at least 20° C. higher than the cloud point.

The cooling temperature range of the fatty acid mixture is from cloud point −2 to −13° C., from the viewpoint to suppress the increase of the slurry viscosity, thereby enabling easy separation of the saturated fatty acid precipitated as a crystal, to reduce the amount of saturated fatty acid in the objective fatty acid composition, and to improve the yield of the objective fatty acid composition, and more preferably from cloud point −3 to −11.5° C., more preferably from cloud point −3.5 to −10° C., even more preferably from cloud point −4 to −8° C.

The cooling temperature range depends on the cloud point and, for example, is preferably from 2 to 13° C., more preferably from 3 to 11° C., even more preferably from 4 to 9° C.

The cooling rate to the cooling temperature range of the fatty acid mixture is preferably 10° C./min or less, more preferably 8° C./min or less, even more preferably 5° C./min or less, from the viewpoint to reduce the amount of saturated fatty acid in the objective fatty acid composition and to improve the productivity, and is preferably 0.1° C./min or more, more preferably 0.3° C./min or more, from the viewpoint of the industrial productivity. The cooling rate to the cooling temperature range of the fatty acid mixture is preferably from 0.1 to 8° C./rain, more preferably 0.3 to 5° C./min.

The cooling operation may be performed using a cooling jacket, a heat exchanger, and the like.

The cooling operation is preferably performed under stirring. Stirring is preferably performed using a scraping blade with a scraper when the viscosity of the crystal precipitated is high and using an anchor blade when the viscosity is low, in order to mix the slurry within a uniform temperature range.

The aqueous wetting agent solution used in the present invention is an aqueous solution containing a surfactant and an inorganic electrolyte.

The surfactant is not particularly limited and includes, for example, an anionic surfactant such as an alkyl sulfate ester salt, a polyoxyethylene alkyl sulfate ester salt, an alkenyl sulfate ester salt, and a polyoxyethylene alkenyl sulfate ester salt having an alkyl or alkenyl group having 6 to 20, preferably 8 to 19 carbon atoms; a nonionic surfactant such as polyoxyethylene alkyl ether and polyoxyethylene alkylphenol ether; and an amphoteric surfactant such as laurylbetaine and stearylbetaine. These may be used solely or in a combination of two or more kinds. Among them, a mixture of sodium decyl sulfate and sodium dodecyl sulfate is preferred from the viewpoint of the economic performance and safety.

The amount of the surfactant to be used is preferably 0.1 parts or more, more preferably 0.3 parts or more and is preferably 10 parts or less, more preferably 5 parts or less relative to 100 parts of the fatty acid mixture from the viewpoint to efficiently separate the fatty acid composition having a low content of saturated fatty acid. The amount of the surfactant to be used is preferably from 0.1 to 10 parts, more preferably from 0.3 to 5 parts relative to 100 parts of the fatty acid mixture.

The inorganic electrolyte includes, for example, inorganic salts such as sodium chloride, sodium sulfate, magnesium sulfate, and aluminum sulfate.

The amount of the inorganic electrolyte to be used is preferably 0.5 parts or more, more preferably 1 part or more and is preferably 20 parts or less, more preferably 10 parts or less relative to 100 parts of the fatty acid mixture from the viewpoint to efficiently separate the fatty acid composition having a low content of saturated fatty acid. The amount of the inorganic electrolyte to be used is preferably from 0.5 to 20 parts, more preferably from 1 to 10 parts relative to 100 parts of the fatty acid mixture.

The amount of the aqueous wetting agent solution to be used is preferably 50 parts or more, more preferably 100 parts or more and is preferably 400 parts or less, more preferably 300 parts or less relative to 100 parts of the fatty acid mixture from the viewpoint to efficiently separate the fatty acid composition having a low content of saturated fatty acid. The amount of the aqueous wetting agent to be used is preferably from 50 to 400 parts, more preferably from 100 parts to 300 parts relative to 100 parts of the fatty acid mixture.

Although the temperature of the aqueous wetting agent solution when mixed with the fatty acid mixture is not particularly limited, the same temperature range as the cooling temperature range is preferable from the viewpoint of the efficiency of cooling.

Note that in the present invention a known freezing-point depressant may be used in order to suppress solidification of the aqueous wetting agent solution. Examples of the freezing-point depressant include glycerol, ethyleneglycol, and the like. The freezing-point depressant only needs to be present when the fatty acid mixture is cooled and the time of its addition is not particularly limited.

Mixing of the fatty acid mixture and the aqueous wetting agent solution is preferably performed under stirring in order to maintain a good dispersion of the crystals of saturated fatty acid precipitated. Although the extent of stirring depends on the apparatus, it is preferable to select the condition in which crashing of the crystals of saturated fatty acid precipitated is suppressed and the wetting agent is uniformly dispersed.

After the fatty acid mixture and the aqueous wetting agent solution are mixed, the mixture is aged by maintaining it in a cooling temperature range for a certain period of time. By such aging treatment, the fatty acid composition having a low content of saturated fatty acid may be obtained. The aging time is preferably 5 minutes or more, more preferably 10 minutes or more, even more preferably 15 minutes or more and is preferably 180 minutes or less, more preferably 150 minutes or less, even more preferably 90 minutes or less from the viewpoint to obtain the fatty acid composition having a low content of saturated fatty acid. The aging time is preferably from 5 to 180 minutes, more preferably from 10 to 150 minutes, even more preferably from 15 to 90 minutes. Note that the time herein means the total time during which the mixture of the fatty acid mixture and the aqueous wetting agent solution is in the cooling temperature range.

The viscosity of the slurry when the aging treatment has been finished is preferably 30 mPa·s or more, more preferably 40 mPa·s or more, even more preferably 50 mPa·s or more and is preferably 3000 mPa·s or less, more preferably 2500 mPa·s or less, even more preferably 2000 mPa·s or less at the temperature when the aging has been finished from the viewpoint of the operability and easy separation of the saturated fatty acid precipitated as a crystal. The viscosity of the slurry is preferably from 30 to 3000 mPa·s, more preferably from 40 to 2500 mPa·s, even more preferably from 50 to 2000 mPa·s.

In step (3), the solid phase containing the saturated fatty acid which has precipitated in step (2) and the aqueous phase are separated from the liquid oil phase, thereby obtaining the fatty acid composition in the form of a liquid oil phase. Separation of the solid phase and the aqueous phase from the liquid oil phase may be performed, for example, by the method such as settled separation, filtration, and centrifugation. Among them, centrifugation is preferred from the viewpoint of the industrial productivity and operability.

Centrifugation is roughly classified into batch type and continuous type according to supplying operation, which is used properly depending on the amount to be treated. A continuous type centrifugation apparatus is preferred if the amount to be treated is large and a batch type centrifugation apparatus is preferred if the amount to be treated is small. Examples of the continuous type centrifugation apparatus include a high speed separator manufactured by Alfa Laval Inc. Examples of the batch type centrifugation apparatus to treat a small amount include a high speed refrigerated centrifuge himac CR-GIII produced by Hitachi Koki Co., Ltd.

In the present invention, the saturated fatty acid to be removed by fractionation includes a linear chain or a branched chain saturated fatty acid including, for example, a linear chain or branched chain saturated fatty acid having 12 to 24, preferably 16 to 20 carbon atoms, such as palmitic acid, and stearic acid. The fatty acid to be obtained by fractionation includes a linear chain or a branched chain unsaturated fatty acid including, for example, a linear chain or branched chain unsaturated fatty acid having 16 to 22 carbon atoms, such as oleic acid, linoleic acid, linolenic acid, and erucic acid.

The yield of the fatty acid composition to be obtained as a liquid oil phase relative to the fatty acid mixture depends on the concentration of the saturated fatty acid contained in the fatty acid mixture, and is preferably from 75 to 94%, more preferably from 80 to 92%, even more preferably from 83 to 90% from the viewpoint of the production efficiency.

The liquid oil phase obtained may be assumed to be the fatty acid composition of the present invention. The liquid oil phase from which water has been removed may also be assumed to be the fatty acid composition of the present invention. Other steps such as water washing may be added.

The content of the saturated fatty acid in the fatty acid composition obtained by the production method of the present invention is 8% or less, preferably 7.5% or less, more preferably 7% or less and is preferably 4% or more, more preferably 5% or more. The content of the saturated fatty acid in the fatty acid composition is preferably from 4 to 7.5%, more preferably from 5 to 7%. The content of the trans unsaturated fatty acid in the fatty acid composition is preferably 0.01% or more, more preferably 0.05% or more, even more preferably 0.1% or more and is preferably 2% or less, more preferably 1.5% or less, even more preferably 1% or less. The content of the trans unsaturated fatty acid in the fatty acid composition is preferably from 0.01 to 2%, more preferably from 0.05 to 1.5%, even more preferably from 0.1 to 1%.

The amount of the saturated fatty acid in the fatty acid composition may be reduced by a method comprising the following steps (1) to (3) of:
(1) obtaining a fatty acid mixture by adjusting the component ratio of a decomposed fatty acid composition obtained by hydrolyzing a fat or oil so that
the content of fatty acid is from 80 to 96% by mass,
the content of monoacylglycerol is from 0.3 to 8% by mass,
the content of diacylglycerol is from 1 to 12% by mass, and
the mass ratio of diacylglycerol to monoacylglycerol [(DAG)/(MAG)] is from 0.5 to 40;
(2) cooling the fatty acid mixture obtained in step (1) to a temperature within the range from the temperature 2° C. lower than the cloud point of the fatty acid mixture to the temperature 13° C. lower than the cloud point, then mixing an aqueous wetting agent solution therewith, and maintaining the temperature of the mixture within the above-mentioned range; and
(3) separating the solid phase precipitated in step (2) and the aqueous phase from the liquid oil phase, thereby obtaining the fatty acid composition in the form of a liquid oil phase.

In the method to reduce the amount of the saturated fatty acid in the fatty acid composition of the present invention, the difference between the saturated fatty acid in the decomposed fatty acid composition as the raw material and the saturated fatty acid in the resultant fatty acid composition may be from 2 to 10%, preferably from 4 to 8%, more preferably from 5 to 7%.

The resultant fatty acid composition may contain not only fatty acid but also triacylglycerol, diacylglycerol or monoacylglycerol. The total content of diacylglycerol and monoacylglycerol in the fatty acid composition may be preferably 1.5% or more, more preferably 3% or more, even more preferably 4% or more and is preferably 19% or less, more preferably 15% or less, even more preferably 12% or less. The total content of diacylglycerol and monoacylglycerol in the fatty acid composition is preferably from 1.5 to 19%, more preferably from 3 to 15%, even more preferably from 4 to 12%.

The fatty acid composition obtained according to the production method of the present invention may be used similarly to the common fatty acid composition. It is especially suitable for the raw material of the esterified oil, which has the excellent cold resistance.

Preferred embodiments of the present invention are exemplified below.

<1> A method for producing a fatty acid composition having the content of saturated fatty acid of 8% by mass or less, comprising the following steps (1) to (3) of:
(1) obtaining a fatty acid mixture by adjusting the component ratio of a decomposed fatty acid composition obtained by hydrolyzing a fat or oil so that
the content of fatty acid is from 80 to 96% by mass,
the content of monoacylglycerol is from 0.3 to 8% by mass,
the content of diacylglycerol is from 1 to 12% by mass, and
the mass ratio of diacylglycerol to monoacylglycerol [(DAG)/(MAG)] is from 0.5 to 40;
(2) cooling the fatty acid mixture obtained in step (1) to a temperature within the range from the temperature 2° C. lower than the cloud point of the fatty acid mixture to the temperature 13° C. lower than the cloud point, then mixing an aqueous wetting agent solution therewith, and maintaining the temperature of the mixture within the above-mentioned range; and
(3) separating the solid phase precipitated in step (2) and the aqueous phase from the liquid oil phase, thereby obtaining the fatty acid composition in the form of a liquid oil phase.

<2> A method for reducing the amount of saturated fatty acid in the fatty acid composition comprising the following steps (1) to (3) of:
(1) obtaining a fatty acid mixture by adjusting the component ratio of a decomposed fatty acid composition obtained by hydrolyzing a fat or oil so that
the content of fatty acid is from 80 to 96% by mass,
the content of monoacylglycerol is from 0.3 to 8% by mass,
the content of diacylglycerol is from 1 to 12% by mass, and
the mass ratio of diacylglycerol to monoacylglycerol [(DAG)/(MAG)] is from 0.5 to 40;
(2) cooling the fatty acid mixture obtained in step (1) to a temperature within the range from the temperature 2° C. lower than the cloud point of the fatty acid mixture to the temperature 13° C. lower than the cloud point, then mixing an aqueous wetting agent solution therewith, and maintaining the temperature of the mixture within the above-mentioned range; and (3) separating the solid phase precipitated in step (2) and the aqueous phase from the liquid oil phase, thereby obtaining the fatty acid composition in the form of a liquid oil phase.

<3> The method of item <1> or <2>, wherein the fat or oil to be hydrolyzed in step (1) is preferably a fat or oil selected from rapeseed oil, soybean oil, sunflower oil, cottonseed oil, and palm oil, more preferably a fat or oil selected from cottonseed oil, sunflower oil, and palm oil.

<4> The method of any one of items <1> to <3>, wherein saturated fatty acid accounts for preferably 20% by mass or less, more preferably 18% by mass or less, even more preferably 14% by mass or less, and is preferably 6% by mass or more, more preferably 8% by mass or more, and is preferably from 6 to 18% by mass, more preferably from 8 to 14% by mass of the fatty acid constituting the fat or oil in step (1).

<5> The method of any one of items <1> to <4>, wherein the carbon number of the saturated fatty acid constituting the fat or oil in step (1) is preferably from 12 to 24, more preferably from 16 to 20.

<6> The method of any one of items <1> to <5>, wherein the fat or oil to be hydrolyzed in step (1) is preferably an undeodorized fat or oil.

<7> The method of any one of items <1> to <6>, wherein the hydrolysis of the fat or oil in step (1) is preferably high-temperature high-pressure decomposition or enzymatic decomposition.

<8> The method of any one of items <1> to <7>, wherein the concentration of the fatty acid in the fatty acid mixture in step (1) is preferably 82% by mass or more, more preferably 84% by mass or more, even more preferably 86% by mass or more, and is preferably 95% by mass or less, more preferably 94% by mass or less, even more preferably 93% by mass or less, and is preferably from 82 to 95% by mass, more preferably from 84 to 94% by mass, even more preferably from 86 to 93% by mass.

<9> The method of any one of items <1> to <8>, wherein the content of monoacylglycerol in the fatty acid mixture in step (1) is preferably 0.4% by mass or more, more preferably 0.5% by mass or more, even more preferably 0.6% by mass or more, and is preferably 6.5% by mass or less, more preferably 5.5% by mass or less, more preferably 4.5% by mass or less, even more preferably 4% by mass or less, and is preferably from 0.3 to 6.5% by mass, more preferably from 0.4 to 5.5% by mass, more preferably from 0.5 to 4.5% by mass, even more preferably from 0.6 to 4% by mass.

<10> The method of any one of items <1> to <9>, wherein the content of trans unsaturated fatty acid in the fatty acid mixture in step (1) is preferably from 0 to 2% by mass, more preferably from 0 to 1.5% by mass, even more preferably from 0 to 1% by mass.

<11> The method of any one of items <1> to <10>, wherein the content of diacylglycerol in the fatty acid mixture in step (1) is preferably 2% by mass or more, more preferably 2.5% by mass or more, even more preferably 3% by mass or more, and is preferably 11% by mass or less, more preferably 10% by mass or less, even more preferably 9% by mass or less, and is preferably from 2 to 11% by mass, more preferably from 2.5 to 10% by mass, even more preferably from 3 to 9% by mass.

<12> The method of any one of items <1> to <11>, wherein the mass ratio of diacylglycerol to monoacylglycerol [(DAG)/(MAG)] in the fatty acid mixture in step (1) is preferably 0.6 or more, more preferably 0.8 or more, more preferably 1 or more, even more preferably 1.1 or more, and is preferably 20 or less, more preferably 12 or less, more preferably 9 or less, even more preferably 7 or less, and is preferably from 0.6 to 20, more preferably from 0.8 to 12, more preferably from 1 to 9, even more preferably from 1.1 to 7.

<13> The method of any one of items <1> to <12>, wherein the temperature of the fatty acid mixture in step (2) is set beforehand at a temperature preferably at least 10° C. higher than its cloud point, more preferably at least 15° C. higher, even more preferably 20° C. higher than the cloud point.

<14> The method of any one of items <1> to <13>, wherein the cooling temperature in step (2) is preferably from cloud point of the fatty acid mixture −3 to −11.5° C., more preferably from the cloud point −3.5 to −10° C., even more preferably from the cloud point −4 to −8° C.

<15> The method of any one of items <1> to <14>, wherein the cooling rate in step (2) is preferably 10° C./min or less, more preferably 8° C./min or less, even more preferably 5° C./rain or less, and is preferably 0.1° C./min or more, more preferably 0.3° C./min or more, and is preferably from 0.1 to 8° C./rain, more preferably 0.3 to 5° C./min.

<16> The method of any one of items <1> to <15>, wherein the aqueous wetting agent solution in step (2) is preferably an aqueous solution containing a surfactant and an inorganic electrolyte.

<17> The method of item <16>, wherein the surfactant is preferably selected from an anionic surfactant, a nonionic surfactant, and an amphoteric surfactant, more preferably is an anionic surfactant.

<18> The method of item <16> or <17>, wherein the inorganic electrolyte is preferably an inorganic salt selected from sodium chloride, sodium sulfate, magnesium sulfate, and aluminum sulfate.

<19> The method of any one of items <16> to <18>, wherein the amount of the surfactant to be used is preferably 0.1 parts or more, more preferably 0.3 parts or more relative to 100 parts of the fatty acid mixture, and is 10 parts or less, more preferably 5 parts or less relative to 100 parts of the fatty acid mixture, and is preferably from 0.1 to 10 parts, more preferably from 0.3 to 5 parts relative to 100 parts of the fatty acid mixture.

<20> The method of any one of items <16> to <19>, wherein the amount of the inorganic electrolyte to be used is preferably 0.5 parts or more, more preferably 1 part or more relative to 100 parts of the fatty acid mixture, and is 20 parts or less, more preferably 10 parts or less relative to 100 parts of the fatty acid mixture, and is preferably from 0.5 to 20 parts, more preferably from 1 to 10 parts relative to 100 parts of the fatty acid mixture.

<21> The method of any one of items <1> to <20>, wherein the amount of the aqueous wetting agent solution to be used in step (2) is preferably 50 parts or more, more preferably 100 parts or more relative to 100 parts of the fatty acid mixture, and is 400 parts or less, more preferably 300 parts or less relative to 100 parts of the fatty acid mixture, and is from 50 to 400 parts, more preferably from 100 parts to 300 parts relative to 100 parts of the fatty acid mixture.

<21> The method of any one of items <1> to <20>, wherein the aqueous wetting agent solution in step (2) contains at least one freezing-point depressant selected from glycerol and ethyleneglycol.

<22> The method of any one of items <1> to <21>, wherein the cooling temperature is maintained for preferably 5 minutes or more, more preferably 10 minutes or more, even more preferably 15 minutes or more, and is preferably 180 minutes or less, more preferably 150 minutes or less, even more preferably 90 minutes or less, and is preferably from 5 to 180 minutes, more preferably from 10 to 150 minutes, even more preferably from 15 to 90 minutes after mixing the aqueous wetting agent solution in step (2).

<23> The method of any one of items <1> to <22>, wherein the viscosity of the final fatty acid mixture in step (2) is preferably 30 mPa·s or more, more preferably 40 mPa·s or more, even more preferably 50 mPa·s or more, and is 3000 mPa·s or less, more preferably 2500 mPa·s or less, even more preferably 2000 mPa·s or less, and is preferably from 30 to 3000 mPa·s, more preferably from 40 to 2500 mPa·s, even more preferably from 50 to 2000 mPa·s.

<24> The method of any one of items <1> to <23>, wherein the separation means of the aqueous phase and oil phase in step (3) is centrifugation, settled separation or filtration.

<25> The method of any one of items <1> to <24>, wherein the content of the saturated fatty acid in the fatty acid composition obtained in step (3) is preferably 7.5% by mass or less, more preferably 7% by mass or less, and is preferably 4% by mass or more, more preferably 5% by mass or more, and is preferably from 4 to 7.5% by mass, more preferably from 5 to 7% by mass.

<26> The method of any one of items <1> to <25>, wherein the content of the trans unsaturated fatty acid in the fatty acid composition obtained in step (3) is preferably 0.01% by mass or more, more preferably 0.05% by mass or more, even more preferably 0.1% by mass or more, and is 2% by mass or less, more preferably 1.5% by mass or less, even more preferably 1% by mass or less, and is preferably from 0.01 to 2% by mass, more preferably from 0.05 to 1.5% by mass, even more preferably from 0.1 to 1% by mass.

<27> The method of any one of items <1> to <26>, wherein the total content of diacylglycerol and monoacylglycerol in the fatty acid composition obtained in step (3) is preferably 1.5% by mass or more, more preferably 3% by mass or more, even more preferably 4% by mass or more, and is preferably 19% by mass or less, more preferably 15% by mass or less, even more preferably 12% by mass or less, and is preferably from 1.5 to 19% by mass, more preferably from 3 to 15% by mass, even more preferably from 4 to 12% by mass.

<28> The method of any one of items <1> to <27>, wherein step (1) is a step to obtain the fatty acid mixture without performing distillation of the decomposed fatty acid composition obtained by hydrolyzing the fat or oil.

EXAMPLES

Analysis Method (i) Measurement of Glyceride Composition

To a glass sample vial were added about 10 mg of the dehydrated sample and 0.5 mL of trimethylsilylating agent ("Silylation Agent TH", produced by Kanto Chemical Co., Inc.). The vial was tightly sealed and heated for 20 minutes at 70° C. After cooling, 1.5 mL of water and 1.5 mL of hexane were added to this vial and the vial was shaken. After still standing, the hexane layer was subjected to gas chromatography (GLC) to analyze the glyceride composition.

GLC Conditions

Apparatus: Agilent 6890 Series (produced by Agilent Technologies)
Integrator: Chemistation B 02.01 SR2 (produced by Agilent Technologies)
Column: DB-1ht, 10 m (produced by Agilent Technologies)
Carrier gas: 1.0 mL He/min
Injector: Split (1:50), T=320° C.
Detector: FID, T=350° C.

Oven temperature: raised at 1° C./min from 80° C. to 340° C., and held for 15 minutes at 340° C.

(ii) Measurement of Composition of the Constituent Fatty Acid

Analysis of the fatty acid was performed by gas chromatography (GLC) of the samples obtained by preparation of fatty acid methyl ester according to "Preparation of Methyl Ester of Fatty Acids (Boron Trifluoride-Methanol Method) (2.4.1.2-1996)" in "Standard Methods for the Analysis of Fats, Oils and Related Materials, 2003" edited by Japan Oil Chemists' Society.

(iii) Measurement of Acid Value

Acid value was measured according to "Acid Value (2.3.1-1996)" in "Standard Methods for the Analysis of Fats, Oils and Related Materials, 2003" edited by Japan Oil Chemists' Society.

(iv) Measurement of Concentration of Fatty Acid

Acid value and fatty acid composition were measured for the decomposed fatty acid composition, fatty acid mixture and fatty acid composition and the value obtained by the following equation (1):

$$\text{Concentration of fatty acid(\% by mass)} = x^* y / 56.1 / 10 \quad (1)$$

(x=acid value (mg KOH/g), y=average molecular weight calculated from fatty acid composition) was defined as the concentration of fatty acid, according to "Knowledge of Fat and Oil Products (Yushiseihin No Chishiki)" (published by Saiwai Shobo Co., Ltd.).

(v) Measurement of Cloud Point of the Fatty Acid Mixture

The crystal precipitation temperature was measured after the sample was heated to 70° C. to completely dissolve and then cooled to 30° C. at a rate of 10° C./min and to −20° C. at a rate of 0.5° C./min, using a high sensitivity differential scanning calorimeter DSC7020 produced by SII Nano Technology Inc.

(vi) Measurement of Slurry Viscosity

The sample was measured five times using a B Type Model BL viscometer produced by Tokyo Keiki Inc. and an average of the three values was used excluding the higher and lower values.

(vii) Calculation of the Yield of the Fatty Acid Composition

The yield of the fatty acid composition was calculated according to the following equation (2):

$$\text{Yield of fatty acid composition (\%)} = (a-c)/(b-c)^*100 \quad (2)$$

(a=total % of saturated fatty acid in the fatty acid mixture, b=total % of saturated fatty acid in the fatty acid composition, c=total % of saturated fatty acid in the solid fatty acid).

Preparation of Diacylglycerol-Containing Oil

Esterification was performed by mixing 100 parts of undeodorized sunflower fatty acid and 15 parts of glycerol and using 5 parts of Lipozyme RM IM (produced by Novozymes Japan) at a temperature of 50° C. and a pressure of 400 Pa under stirring. Fatty acid and monoacylglycerol were removed by thin-film distillation from the resultant esterified oil. To the esterified oil was then added 0.5% of aqueous 50% citric acid solution. The mixture was stirred and washed with water for three times to obtain the water-washed diacylglycerol-containing oil, which was then deodorized by steam (temperature: 240° C., pressure: 260 Pa, time: 34 minutes, steam/raw material ratio: 3%/h) to obtain the diacylglycerol-containing oil. The glyceride composition of the diacylglycerol-containing oil was 2% of monoacylglycrol, 94% of diacylglycerol and 4% of triacylglycerol.

Preparation of Fatty Acid Mixture (Sample a)

Undeodorized sunflower oil was hydrolyzed by high-temperature high-pressure decomposition method using a batch type autoclave (capacity: 1.99 liter, designed pressure: 10 MPa, designed temperature: 300° C., material: SUS 316) produced by Nitto Koatsu Co., Ltd. An autoclave was charged with 300 g of undeodorized sunflower oil and 700 g of distilled water and sealed. The autoclave was then pressurized to 1.0 MPa with nitrogen, held for 5 minutes and degassed. This operation was repeated three times and finally the gas phase was substituted with nitrogen. The mixture was then heated to 240° C., which was the reaction temperature, under stirring at 600 rpm. The time to raise the temperature to 240° C. was about 60 minutes. The ultimate pressure was 3.2 MPa. After performing the hydrolysis for 3 hours, the mixture was cooled to 70° C. The cooling time to 70° C. was about 80 minutes. The hydrolyzed reactant containing crude glycerol was entirely taken out from the autoclave and centrifuged (5,000 g, 30 minutes) to remove the water layer and obtain the decomposed fatty acid composition. The decomposed fatty acid composition was then put in a four-neck 1000 mL flask and water was completely removed under vacuum at 260 Pa and at a temperature of 70° C. for 30 minutes under stirring (half-moon shaped blade, diameter 75 mm and height 22 mm, 400 rpm) to obtain the fatty acid mixture (sample a).

Preparation of Fatty Acid Mixture (Sample b)

The same operation as that for sample a was performed ten times except that the amount of the undeodorized sunflower oil and distilled water to charge the autoclave with was 600 g and 360 g, respectively, which were uniformly mixed to obtain the fatty acid mixture (sample b).

Preparation of Fatty Acid Mixture (Sample c)

The same operation as that for sample a was performed except that the amount of the undeodorized sunflower oil and water to charge the autoclave with was 600 g and 360 g, respectively and that the hydrolysis was performed for 2 hours to obtain the fatty acid mixture (sample c).

Preparation of Fatty Acid Mixture (Sample d)

The same operation as that for sample a was performed six times except that the amount of the undeodorized sunflower oil and water to charge the autoclave with was 600 g and 360 g, respectively, which were uniformly mixed and that the hydrolysis was performed for 1.5 hours to obtain the fatty acid mixture (sample d).

Preparation of Fatty Acid Mixture (Sample e)

The same operation as that for sample a was performed except that the amount of the undeodorized sunflower oil and water to charge the autoclave with was 600 g and 360 g, respectively and that the hydrolysis was performed for 1.3 hours to obtain the fatty acid mixture (sample e).

Preparation of Fatty Acid Mixture (Sample f)

Hydrolysis of undeodorized sunflower oil by enzymatic decomposition method was performed using powdered lipase (Lipase AY "Amano" 30 G produced by Amano Enzyme Inc.) under batch stirring. A four-neck flask with a capacity of 5 liter was charged with 2000 g of undeodorized sunflower oil. The temperature was raised to 40° C. under stirring (half-moon shaped blade, diameter 90 mm and height 25 mm, 300 rpm). Then 4 g of powdered lipase was put in the flask after dissolving it in 1200 g of distilled water. The air phase of the four-neck 5 liter flask was substituted with nitrogen. After performing the hydrolysis for 20 hours, the hydrolyzed reactant containing crude glycerol was entirely taken out and centrifuged (5,000 g, 30 minutes) to remove the water layer and obtain the decomposed fatty acid composition. The decomposed fatty acid composition was then returned to the four-neck 5 liter flask and 2000 g of distilled water was added. The mixture was stirred for 30 minutes at 500 rpm and water layer was removed by centrifugation. This operation was repeated three times. The water-washed decomposed fatty acid composition was then put in a four-neck flask with a capacity of 3 liter and water was completely removed under vacuum at 260 Pa and at a temperature of 70° C. for 30 minutes under stirring (half-moon shaped blade, diameter 75 mm and height 22 mm, 400 rpm) to obtain the fatty acid mixture (sample f).

Preparation of Fatty Acid Mixture (Sample g)

Thin-film distillation of the fatty acid mixture (Sample b) was performed using a wiped film evaporator (Type 2-03 produced by Kobelco Eco-Solutions Co., Ltd., inner diameter: 5 cm, heat transfer area: 0.03 m$^2$). The operation was performed under the conditions of the set temperature of the heater: 150° C., pressure: from 0.5 to 1 Pa, and flow rate: 200 g/hr to obtain the fatty acid mixture (sample g).

Preparation of Fatty Acid Mixture (Sample h)

Thin-film distillation of the fatty acid mixture (Sample b) was performed using a wiped film evaporator (Type 2-03 produced by Kobelco Eco-Solutions Co., Ltd., inner diameter: 5 cm, heat transfer area: 0.03 m$^2$). The operation was performed under the conditions of the set temperature of the heater: 150° C., pressure: from 0.5 to 1 Pa, and flow rate: 120 g/hr to obtain the fatty acid mixture (sample h).

Preparation of Fatty Acid Mixture (Sample i)

Thin-film distillation of the fatty acid mixture (Sample b) was performed using a wiped film evaporator (Type 2-03 produced by Kobelco Eco-Solutions Co., Ltd., inner diameter: 5 cm, heat transfer area: 0.03 m$^2$). The operation was performed under the conditions of the set temperature of the heater: 200° C., pressure: from 0.5 to 1 Pa, and flow rate: 120 g/hr to obtain the fatty acid mixture (sample i).

Preparation of Fatty Acid Mixture (Sample j)

The fatty acid mixture (Sample j) was obtained by mixing 209 g of the fatty acid mixture (Sample h) and 11 g of diacylglycerol-containing oil.

Preparation of Fatty Acid Mixture (Sample k)

The fatty acid mixture (Sample k) was obtained by mixing 1400 g of the fatty acid mixture (Sample b) and 600 g of the fatty acid mixture (Sample f).

Preparation of Fatty Acid Mixture (Sample l)

The fatty acid mixture (Sample l) was obtained by mixing 160 g of the fatty acid mixture (Sample h), 40 g of the fatty acid mixture (Sample i) and 20 g of diacylglycerol-containing oil.

Preparation of Fatty Acid Mixture (Sample m)

The fatty acid mixture (Sample m) was obtained by mixing 195 g of the fatty acid mixture (Sample i) and 25 g of diacylglycerol-containing oil.

Examples 1 to 10 and Comparative Examples 1 to 6

A cylindrical stainless steel vessel with a capacity of 1 liter (diameter: 105 mm) equipped with a scraper-type stirring blade was charged with 200 g each of the fatty acid mixtures a to m, which were dissolved at 70° C., and stirred with an anchor blade of the diameter of 90 mm and the height of 150 mm at 50 rpm. Each of the fatty acid mixture was cooled to the cooling temperature shown in Table 1 at a cooling rate of 0.5° C./min after the temperature reached 30° C. To this mixture was added 300 g of the aqueous wetting agent solution (94% of water, 2% of a mixture of sodium decyl sulfate and sodium dodecyl sulfate, and 4% of magnesium sulfate) at the cooling temperature shown in Table 1. The slurry was stirred and aged at the cooling temperature shown in Table 1 for 60 minutes at 100 rpm.

After measuring the viscosity, the slurry was centrifuged for 10 minutes at the centrifugal acceleration of 2000 g using a centrifuge (a high speed refrigerated centrifuge himac CR- GIII produced by Hitachi Koki Co., Ltd.) cooled at the cooling temperature shown in Table 1. The liquid oil phase of the upper layer was separated from the solid phase and aqueous phase. The liquid oil phase of the upper layer was dehydrated under vacuum at 80° C. to obtain the fatty acid composition.

The aqueous phase and the oil phase were heated to 80° C. to liquefy the solid phase and centrifuged for 10 minutes at the centrifugal acceleration of 2000 g using a centrifuge (a high speed refrigerated centrifuge himac CR-GIII produced by Hitachi Koki Co., Ltd.), followed by dehydration under vacuum at 80° C. to obtain the oil phase rich in saturated fatty acid (hereinafter referred to "solid fatty acid").

Comparative Example 7

To 500 g of Sample k was added 0.5 g of the polyglycerol mixed fatty acid ester shown in Table 2 and uniformly dissolved at 70° C. This mixture was put in a cylindrical stainless steel vessel with a capacity of 1 liter (diameter: 105 mm) and stirred with an anchor blade of the diameter of 90 mm and the height of 150 mm at 50 rpm. The mixture was cooled to 5° C. at a cooling rate of 0.5° C./min after the temperature of Sample k reached 30° C. and then aged for 60 minutes at the revolution of the anchor blade of 100 rpm. The mixture was then centrifuged for 10 minutes at the centrifugal acceleration of 2000 g using a centrifuge (a high speed refrigerated centrifuge himac CR-GIII produced by Hitachi Koki Co., Ltd.) cooled at 5° C. to separate the liquid oil phase and the solid fatty acid.

Comparative Example 8

After aging with the same operation as Comparative Example 7, the mixture was filtered under a constant pressure of 0.03 MPa using NY1260D (produced by Nakao Filter Co., Ltd.) (filtration area: 39 cm$^2$) to obtain the liquid oil phase and the solid fatty acid.

Table 1 shows the composition of the fatty acid mixtures, cooling temperature, slurry viscosity after aging for 60 minutes, the composition of the fatty acid composition (liquid oil phase), content of saturated fatty acid in the solid fatty acid, and the yield of the fatty acid composition based on the fatty acid mixture.

TABLE 1

| | | | Example | | | | | |
|---|---|---|---|---|---|---|---|---|
| | | | 1 | 2 | 3 | 4 | 5 | 6 |
| Fat or oil | | | Sunflower oil | Sunflower oil | Sunflower oil | Sunflower oil | Sunflower oil | Sunflower oil |
| Method for preparing decomposed fatty acid composition | Distillation | | — | — | — | — | — | — |
| | Distillation yield [%] | | — | — | — | — | — | — |
| Fatty acid mixture | Sample | | a | j | f | k | k | k |
| | Cloud point [° C.] | | 15 | 15 | 14 | 14 | 14 | 14 |
| | Saturated fatty acid [%] | | 11.3 | 10.8 | 11.3 | 11.3 | 11.3 | 11.3 |
| | Trans unsaturated fatty acid [%] | | 1.0 | 0.9 | 0.1 | 0.8 | 0.8 | 0.8 |
| | AV [mgKOH/g] | | 191 | 138 | 185 | 179 | 179 | 179 |
| | Composition [%] | FFA | 95.1 | 93.7 | 92.2 | 89.5 | 89.5 | 89.5 |
| | | GLY | 0.0 | 0.0 | 0.0 | 0.1 | 0.1 | 0.1 |
| | | MAG | 2.2 | 1.4 | 0.7 | 4.1 | 4.1 | 4.1 |
| | | DAG | 2.2 | 4.7 | 3.2 | 1.8 | 4.8 | 4.8 |
| | | TAG | 0.5 | 0.2 | 3.9 | 1.5 | 1.5 | 1.5 |
| | (DAG)/(MAG) | | 1.0 | 3.31 | 4.6 | 1.2 | 1.2 | 1.2 |
| Fractionation method | | | Wetting agent | Wetting agent | Wetting agent | Wetting agent | Wetting agent | Wetting agent |
| Solid-liquid separation method | | | Centrifugation | Centrifugation | Centrifugation | Centrifugation | Centrifugation | Centrifugation |
| Cooling temperature [° C.] | | | 5 | 5 | 5 | 2 | 5 | 0 |
| Viscosity sites 60 minute aging [mPa · s] | | | 801 | 180 | 59 | 445 | 268 | 194 |
| Fatty acid composition | Trans unsaturated fatty acid [%] | | 1.1 | 1.0 | 0.1 | 0.8 | 0.7 | 0.7 |
| | Saturated fatty acid [%] | | 4.5 | 5.0 | 5.4 | 5.0 | 5.3 | 6.2 |
| | MAG [%] | | 2.2 | 1.8 | 0.6 | 4.7 | 5.0 | 4.3 |
| | DAG [%] | | 2.7 | 6.2 | 4.7 | 6.5 | 6.8 | 5.0 |
| Saturated fatty acid in solid fatty acid [%] | | | 54.6 | 58.7 | 51.9 | 46.6 | 46.4 | 48.3 |
| Yield of fatty acid composition [%] | | | 86.4 | 89.2 | 87.4 | 84.9 | 86.0 | 87.8 |

| | | | Example | | | | Comparative Example | |
|---|---|---|---|---|---|---|---|---|
| | | | 7 | 8 | 9 | 10 | 1 | 2 |
| Fat or oil | | | Sunflower oil | Sunflower oil | Sunflower oil | Sunflower oil | Sunflower oil | Sunflower oil |
| Method for preparing decomposed fatty acid composition | Distillation | | Distillation | — | — | — | — | — |
| | Distillation yield [%] | | 82.7 | — | — | — | — | — |
| Fatty acid mixture | Sample | | l | b | m | c | d | d |
| | Cloud point [° C.] | | 14 | 14 | 14 | 14 | 14 | 14 |
| | Saturated fatty acid [%] | | 10.7 | 11.2 | 10.9 | 11.2 | 11.3 | 11.3 |
| | Trans unsaturated fatty acid [%] | | 0.9 | 0.9 | 0.9 | 0.7 | 0.6 | 0.6 |
| | AV [mgKOH/g] | | 179 | 177 | 172 | 170 | 160 | 160 |
| | Composition [%] | FFA | 89.3 | 88.4 | 85.8 | 84.8 | 79.6 | 79.6 |
| | | GLY | 0.0 | 0.1 | 0.0 | 0.2 | 0.1 | 0.1 |
| | | MAG | 1.8 | 5.6 | 3.0 | 6.7 | 8.5 | 8.5 |
| | | DAG | 0.5 | 5.5 | 10.7 | 6.9 | 9.5 | 9.5 |
| | | TAG | 0.4 | 0.4 | 0.5 | 1.4 | 2.3 | 2.3 |
| | (DAG)/(MAG) | | 4.84 | 0.98 | 3.56 | 1.03 | 1.1 | 1.1 |

TABLE 1-continued

|  |  | | | | | | |
|---|---|---|---|---|---|---|---|
| Fractionation method | | Wetting agent | Wetting agent | Wetting agent | Wetting agent | Wetting agent | Wetting agent |
| Solid-liquid separation method | | Centrifugation | Centrifugation | Centrifugation | Centrifugation | Centrifugation | Centrifugation |
| Cooling temperature [° C.] | | 5 | 5 | 5 | 5 | 5 | 8 |
| Viscosity sites 60 minute aging [mPa · s] | | 103 | 1137 | 566 | 2364 | 3004 | 3071 |
| Fatty acid | Trans unsaturated fatty acid [%] | 1.0 | 0.9 | 0.9 | 0.7 | 0.5 | 0.6 |
| composition | Saturated fatty acid [%] | 5.6 | 5.2 | 5.1 | 5.8 | 6.3 | 6.6 |
|  | MAG [%] | 1.5 | 6.4 | 4.0 | 7.1 | 9.3 | 8.4 |
|  | DAG [%] | 9.7 | 7.4 | 12.7 | 9.2 | 11.8 | 13.9 |
| Saturated fatty acid in solid fatty acid [%] | | 45.4 | 39.9 | 57.1 | 28.7 | 23.7 | 22.5 |
| Yield of fatty acid composition [%] | | 87.2 | 82.1 | 88.9 | 76.5 | 72.0 | 71.3 |

| | | Comparative Example | | | | | |
|---|---|---|---|---|---|---|---|
| | | 3 | 4 | 5 | 6 | 7 | 8 |
| | Fat or oil | Sunflower oil | Sunflower oil | Sunflower oil | Sunflower oil | Sunflower oil | Sunflower oil |
| Method for preparing | Distillation | — | Distillation | Distillation | Distillation | Distillation | Distillation |
| decomposed fatty acid | Distillation yield [%] | — | 72.0 | 79.3 | 90.4 | — | — |
| composition | | | | | | | |
| Fatty acid | Sample | e | g | h | i | k | k |
| mixture | Cloud point [° C.] | 13 | 15 | 15 | 15 | 14 | 14 |
|  | Saturated fatty acid [%] | 11.3 | 9.7 | 11.0 | 11.0 | 11.3 | 11.3 |
|  | Trans unsaturated fatty acid [%] | 0.6 | 0.5 | 0.9 | 0.9 | 0.8 | 0.8 |
|  | AV [mgKOH/g] | 140 | 200 | 198 | 194 | 179 | 179 |
|  | Composition FFA | 69.7 | 99.9 | 98.5 | 96.8 | 89.5 | 89.5 |
|  | [%] GLY | 0.1 | 0.0 | 0.9 | 0.0 | 0.1 | 0.1 |
|  | MAG | 9.8 | 0.0 | 1.4 | 3.2 | 4.1 | 4.1 |
|  | DAG | 15.1 | 0.1 | 0.0 | 0.0 | 4.6 | 4.0 |
|  | TAG | 5.3 | 0.0 | 0.0 | 0.0 | 1.5 | 1.5 |
|  | (DAG)/(MAG) | 1.5 | — | — | — | 1.2 | 1.2 |
| Fractionation method | | Wetting agent | Wetting agent | Wetting agent | Wetting agent | Dry fractionation | Dry fractionation |
| Solid-liquid separation method | | Centrifugation | Centrifugation | Centrifugation | Centrifugation | Centrifugation | Filtration |
| Cooling temperature [° C.] | | 5 | 5 | 5 | 5 | 5 | 5 |
| Viscosity sites 60 minute aging [mPa · s] | | 3099 | 69 | 1470 | 1233 | 7.9 | 79 |
| Fatty acid | Trans unsaturated fatty acid [%] | 0.6 | 0.5 | 1.0 | 0.9 | 0.95 | 0.92 |
| composition | Saturated fatty acid [%] | 6.0 | 4.2 | 4.1 | 4.6 | 6.8 | 6.7 |
|  | MAG [%] | 10.4 | 0.1 | 1.5 | 4.9 | 5.5 | 9.5 |
|  | DAG [%] | 16.4 | 0.7 | 0.1 | 0.4 | 6.5 | 6.5 |
| Saturated fatty acid in solid fatty acid [%] | | 22.0 | 57.1 | 61.0 | 26.5 | 30.3 | 38.9 |
| Yield of fatty acid composition [%] | | 71.3 | 89.6 | 88.3 | 79.2 | 80.9 | 85.7 |

FFA: Free fatty acid
GLY: Glycerol
MAG: Monoacylglycerol
DAG: Diacylglycerol
TAG: Triacylglycerol

TABLE 2

| Constituent fatty acid (% by mass) | C12 | 20 |
|---|---|---|
|  | C14 | 5 |
|  | C16 | 25 |
|  | C18 | 30 |
|  | C18:1 | 20 |
| Properties | Acid value [mg-KOH/g] | 6 |
|  | Hydroxyl value [mg-KOH/g] | 48 |
|  | Degree of polymerization of polyglycerol | 36 |
|  | Transparent melting point (° C.) | 37 |

As clearly shown in Table 1, it was confirmed that the saturated fatty acid can be easily and efficiently fractionated and removed, therefore the fatty acid composition can be produced in a good yield, because the slurry viscosity after 60 minute aging is low even if monoacylglycerol is contained in the fatty acid mixture obtained by hydrolyzing a fat or oil, when the wetting agent fractionation is performed in the range of from the cloud point −2° C. to the cloud point −13° C. in the presence of diacylglycerol in a certain proportion.

In contrast, Comparative Examples 1 to 3 exhibited a high slurry viscosity after 60 minute aging and neither the decrease of saturated fatty acid in the fatty acid composition, nor the yield of the fatty acid composition was sufficient.

In Comparative Example 4, the fatty acid raw material was distilled to remove monoacylglycerol and diacylglycerol in the fatty acid mixture. Although the viscosity increase in the fractionation could be avoided, the distillation yield was as low as 72% and the total yield of the fatty acid composition relative to the fat or oil was low.

In Comparative Examples 5 and 6, the fatty acid raw material was distilled to remove diacylglycerol in the fatty acid mixture. The viscosity during the fractionation was high and the yield in the fractionation was decreased since there was remaining monoacylglycerol.

Comparative Examples 7 and 8 show the result of the dry fractionation. Although the yield was slightly improved compared to centrifugation by adopting the pressurized filtration as the separation method after cooling, the decrease of saturated fatty acid in the fatty acid composition was not sufficient in both cases.

The invention claimed is:

1. A method for producing a fatty acid composition having a content of saturated fatty acid of 8% by mass or less, comprising:
   (1) providing a fatty acid mixture by adjusting the component ratio of a decomposed fatty acid composition, wherein said decomposed fatty acid composition is obtained by hydrolyzing a fat or oil without performing distillation of the decomposed fatty acid composition, so that in said fatty acid mixture the content of fatty acid is from 80 to 96% by mass,
the content of monoacylglycerol is from 0.3 to 8% by mass,
the content of diacylglycerol is from 1 to 12% by mass, and
the mass ratio of diacylglycerol to monoacylglycerol [(DAG)/(MAG)] is from 0.5 to 40;

(2) cooling the fatty acid mixture from (1) to a temperature within the range from a temperature that is 4° C. lower than the cloud point of the fatty acid mixture to a temperature that is 10° C. lower than the cloud point of the fatty acid mixture, then mixing an aqueous wetting agent solution therewith, and maintaining the temperature of the mixture within the above-mentioned range thereby providing a final fatty acid mixture comprising a precipitated solid phase, an aqueous phase, and a liquid oil phase; and (3) separating the solid phase from the final fatty acid mixture (2) and the aqueous phase from the liquid oil phase, thereby obtaining the fatty acid composition in the form of a liquid oil phase.

2. The method for producing a fatty acid composition of claim 1, wherein the content of monoacylglycerol in the fatty acid mixture of said (1) providing is from 0.4 to 5.5% by mass.

3. The method for producing a fatty acid composition of claim 1, wherein the content of monoacylglycerol in the fatty acid mixture of said (1) providing is from 0.6 to 4% by mass.

4. The method for producing a fatty acid composition of claim 1, wherein the content of diacylglycerol in the fatty acid mixture of said (1) providing is from 2.5 to 10% by mass.

5. The method for producing a fatty acid composition of claim 1, wherein the content of diacylglycerol in the fatty acid mixture of said (1) providing is from 3 to 9% by mass.

6. The method for producing a fatty acid composition of claim 1, wherein the mass ratio of diacylglycerol to monoacylglycerol [(DAG)/(MAG)] is from 1 to 9.

7. The method for producing a fatty acid composition of claim 1, wherein the mass ratio of diacylglycerol to monoacylglycerol [(DAG)/(MAG)] is from 1.1 to 7.

8. The method for producing a fatty acid composition of claim 1, wherein saturated fatty acid accounts for 20% by mass or less of fatty acids constituting the fat or oil.

9. The method for producing a fatty acid composition of claim 1, wherein the fat or oil is an undeodorized fat or oil.

10. The method for producing a fatty acid composition of claim 1, wherein the amount of the aqueous wetting agent solution of said (2) cooling is from 50 to 400 parts by mass relative to 100 parts by mass of the fatty acid mixture.

11. The method for producing a fatty acid composition of claim 1, wherein the aqueous wetting agent solution is an aqueous solution comprising a surfactant and an inorganic electrolyte.

12. The method for producing a fatty acid composition of claim 11, wherein the surfactant is an anionic surfactant.

13. The method for producing a fatty acid composition of claim 11, wherein the inorganic electrolyte is selected from the group consisting of sodium chloride, sodium sulfate, magnesium sulfate, and aluminum sulfate.

14. The method for producing a fatty acid composition of claim 1, wherein the aqueous wetting agent solution of said cooling comprises a freezing-point depressant selected from the group consisting of glycerol and ethylene glycol.

15. The method for producing a fatty acid composition of claim 1, wherein the temperature of the fatty acid mixture is maintained within the range from the temperature 4° C. lower than the cloud point of the fatty acid mixture to the temperature 10° C. lower than the cloud point for 5 to 180 minutes during said (2) cooling.

16. The method for producing a fatty acid composition of claim 1, wherein the viscosity of the final fatty acid mixture of said (2) cooling is from 30 to 3000 mPa·s.

17. The method for producing a fatty acid composition of claim 1, wherein the viscosity of the final fatty acid mixture of said (2) cooling is from 50 to 2000 mPa·s.

18. The method for producing a fatty acid composition of claim 1, wherein the fatty acid composition obtained of said (3) separating comprises a total content of diacylglycerol and monoacylglycerol of from 1.5% by mass to 19% by mass.

19. The method for producing a fatty acid composition of claim 1, wherein the fatty acid composition obtained of said (3) separating comprises a total content of diacylglycerol and monoacylglycerol of from 4% by mass to 12% by mass.

20. A method for reducing the amount of saturated fatty acid in a fatty acid composition comprising:

(1) providing a fatty acid mixture by adjusting the component ratio of a decomposed fatty acid composition, wherein said decomposed fatty acid composition is obtained by hydrolyzing a fat or oil without performing distillation of the decomposed fatty acid composition, so that in said fatty acid mixture
the content of fatty acid is from 80 to 96% by mass,
the content of monoacylglycerol is from 0.3 to 8% by mass,
the content of diacylglycerol is from 1 to 12% by mass, and
the mass ratio of diacylglycerol to monoacylglycerol [(DAG)/(MAG)] is from 0.5 to 40;

(2) cooling the fatty acid mixture obtained from (1) to a temperature within the range from a temperature that is 4° C. lower than the cloud point of the fatty acid mixture to a temperature that is 10° C. lower than the cloud point of the fatty acid mixture, then mixing an aqueous wetting agent solution therewith, and maintaining the temperature of the mixture within the above-mentioned range thereby providing a final fatty acid mixture comprising a precipitated solid phase, an aqueous phase, and a liquid oil phase; and (3) separating the solid phase from the final fatty acid mixture (2) and the aqueous phase from the liquid oil phase, thereby obtaining the fatty acid composition in the form of a liquid oil phase.

21. The method for reducing the amount of saturated fatty acid in the fatty acid composition of claim 20, wherein the content of diacylglycerol in the fatty acid mixture of said (1) providing is from 2.5 to 10% by mass.

22. The method for reducing the amount of saturated fatty acid in the fatty acid composition of claim 20, wherein the content of diacylglycerol in the fatty acid mixture of said (1) providing is from 3 to 9% by mass.

23. The method for producing a fatty acid composition of claim 1, wherein said (2) cooling the fatty acid mixture from (1) is to a temperature within the range from a temperature that is 4° C. lower than the cloud point of the fatty acid mixture to a temperature that is 8° C. lower than the cloud point of the fatty acid mixture.

24. The method for reducing the amount of saturated fatty acid in the fatty acid composition of claim 20, wherein said (2) cooling the fatty acid mixture from (1) is to a temperature within the range from a temperature that is 4° C. lower than the cloud point of the fatty acid mixture to a temperature that is 8° C. lower than the cloud point of the fatty acid mixture.

* * * * *